UNITED STATES PATENT OFFICE.

WALTER ROSENHAIN AND ERNEST H. RODD, OF TEDDINGTON, ENGLAND, ASSIGNORS TO THEMSELVES, THE IMPERIAL TRUST FOR THE ENCOURAGEMENT OF SCIENTIFIC AND INDUSTRIAL RESEARCH, OF WESTMINSTER, ENGLAND, AND RICHARD TETLEY GLAZEBROOK, OF TEDDINGTON, ENGLAND.

BASIC ZIRCONIUM SULFATE.

1,307,883. Specification of Letters Patent. Patented June 24, 1919.

No Drawing. Original application filed October 13, 1917, Serial No. 196,471. Divided and this application filed November 14, 1918. Serial No. 262,587.

*To all whom it may concern:*

Be it known that we, WALTER ROSENHAIN and ERNEST HARRY RODD, both subjects of the King of Great Britain, both residing in Teddington, England, have jointly invented certain new and useful Improvements in Basic Zirconium Sulfate, of which the following is a specification.

This invention relates to the manufacture of a new basic sulfate of zirconium which has the chemical formula $5ZrO_2.2SO_3.14H_2O$ and is sparingly soluble in water.

To manufacture this new compound there is first produced the basic oxychlorid of zirconium which forms the subject matter of our application for U. S. Letters Patent No. 196,471.

For this purpose wet hydroxid of zirconium may be dissolved in a mixture of equal volumes of water and hydrochloric acid of specific gravity 1.15 and the solution concentrated until, on cooling, crystals form abundantly. These crystals are re-crystallized from hydrochloric acid of specific gravity 1.08, whereby the new basic oxychlorid $Zr_5O_8Cl_4.22H_2O$ crystallizes first, leaving a known oxychlorid in solution.

By dissolving the basic oxychlorid in 30 times its weight of water and adding to the solution sulfuric acid or a solution of a sulfate in the proportion illustrated by the equation—

$$Zr_5O_8Cl_4 + 2H_2SO_4 = 5ZrO_2.2SO_3 + 4HCl$$

the new basic sulfate or zirconium is precipitated.

Having thus described the nature of the said invention and the best means we know of carrying the same into practical effect, we claim:—

1. As a new article of manufacture a basic sulfate of zirconium which has the chemical formula $5ZrO_2.2SO_3.14H_2O$ and is sparingly soluble in water.

2. A process for producing basic sulfate of zirconium of the chemical formula $5ZrO_2.2SO_3.14H_2O$, which process consists in adding a substance containing the sulfate radical to a solution of the basic oxychlorid of zirconium $Zr_5O_8Cl_4.22H_2O$.

3. A process for producing basic sulfate of zirconium of the chemical formula $5ZrO_2.2SO_3.14H_2O$, which processes consists in dissolving zirconium hydroxid in a mixture of hydrochloric acid and water, concentrating the solution until, on cooling, crystals form abundantly, re-crystallizing these crystals from hydrochloric acid, then re-dissolving them and adding a substance containing the sulfate radical to the solution.

In testimony whereof we have signed our names to this specification.

WALTER ROSENHAIN.
ERNEST H. RODD.

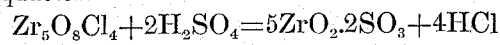

Copies of this patent may be obtained for five cents each, by addressing the "Commissioner of Patents. Washington, D. C."